(12) United States Patent
Legrand et al.

(10) Patent No.: US 6,362,274 B1
(45) Date of Patent: *Mar. 26, 2002

(54) GRAFT COPOLYMERS, METHOD FOR PREPARING SAME, COMPOSITIONS CONTAINING SAID COPOLYMERS, AND USE THEREOF FOR PREPARING PIGMENT DISPERSIONS IN AQUEOUS AND/OR ORGANIC MEDIA

(75) Inventors: Pierre Legrand, Puyricard; Gerard Riess, Mulhouse; Jean-Phillipe Lerch, Burnhaupt le Bas; Daniel Lefevre, Aubagne, all of (FR)

(73) Assignee: Les Peintures Jefco, Marseille (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/117,306

(22) PCT Filed: Jan. 30, 1997

(86) PCT No.: PCT/FR97/00185

§ 371 Date: Feb. 23, 1999

§ 102(e) Date: Feb. 23, 1999

(87) PCT Pub. No.: WO97/28200

PCT Pub. Date: Aug. 7, 1997

(30) Foreign Application Priority Data

Jan. 30, 1996 (FR) .............................................. 96 01368

(51) Int. Cl.[7] .............................. C08J 3/00; C08K 3/00; C08K 3/18; C08K 3/22; C08L 51/00
(52) U.S. Cl. ........................ 524/612; 524/401; 524/430; 524/439; 524/441; 524/504; 525/77; 525/78; 525/79; 525/80; 525/279; 525/286; 525/293; 525/296; 525/309
(58) Field of Search ................................. 524/504, 401, 524/430, 439, 441, 612; 525/77, 78, 79, 80, 279, 286, 293, 296, 309

(56) References Cited

U.S. PATENT DOCUMENTS

| | | | |
|---|---|---|---|
| 4,032,698 A | 6/1977 | Ashe | |
| 4,279,795 A | 7/1981 | Yamashita et al. | |
| 4,659,781 A | 4/1987 | Okude et al. | |
| 5,231,131 A | 7/1993 | Chu et al. | |
| 5,919,442 A | * 7/1999 | Yin et al. ................ | 424/78.18 |

FOREIGN PATENT DOCUMENTS

| | | |
|---|---|---|
| EP | 018099 | 10/1980 |
| EP | 251751 | 1/1988 |
| GB | 1393401 | 5/1975 |
| GB | 1393402 | 5/1975 |
| GB | 1496931 | 1/1978 |

OTHER PUBLICATIONS

"Graft Copolymers Having Hydrophobic Backbone and Hydrophilic Branches. IV. A Copolymerization Study of Water–Soluble Oligovinylpyrrolidone Macromonomers", Journal of Polymer Science, Polymer Chemistry Ed., vol. 27, No. 10, Sep. 1, 1989.

Bonardi et al., "Synthèse et copolymérisation avec l'acrylamide de macroméres d'acrylate de dodécyle", Makromolekulare Chemie, vol. 186, pp. 261–271, 1985.

* cited by examiner

*Primary Examiner*—Patrick D. Niland
(74) *Attorney, Agent, or Firm*—Wolf, Greenfield & Sacks P.C.

(57) ABSTRACT

The invention relates to grafted copolymers comprising at least three sequences of distinct chemical nature, among which one or more sequence(s) for anchoring on solid particles, one or more sequence(s) of hydrophobic character and one or more sequence(s) of hydrophilic character. The invention also concerns their process of preparation, the compositions containing them, their use as agent for dispersing, stabilizing solid particles and/or emulsifying in an aqueous and/or organic medium, as well as use thereof for preparing pigmentary dispersions in aqueous and/or organic medium.

33 Claims, No Drawings

GRAFT COPOLYMERS, METHOD FOR PREPARING SAME, COMPOSITIONS CONTAINING SAID COPOLYMERS, AND USE THEREOF FOR PREPARING PIGMENT DISPERSIONS IN AQUEOUS AND/OR ORGANIC MEDIA

The invention relates to grafted copolymers comprising at least three sequences of distinct chemical nature, among which one or more sequence(s) for anchoring on solid particles, one or more sequence(s) of hydrophobic character and one or more sequence(s) of hydrophilic character.

The invention also concerns their process of preparation, the compositions containing them, their use as dispersing agent, stabilizer of solid particles and/or emulsifier in an aqueous and/or organic medium, as well as their use for the preparation of pigmentary dispersions in an aqueous and/or organic medium.

At the end of their process of manufacture, the solid particles used in the ink and paint industry, essentially pigments and fillers, are in the form of aggregates or agglomerates. Their incorporation in a liquid in order to obtain a stable suspension therefore necessitates a prior step of dispersion, step during which these assemblies are dissociated into elementary particles under the effect of considerable mechanical stresses.

However, the action of these mechanical forces could not be efficient in the absence of a dispersing agent.

These copolymers, employed in solution by adsorption on the surface of the solid, or by coating of the particle before incorporation thereof in the liquid, intervene at each step of the dispersion.

Firstly, they ensure a good wetting of the particle by the continuous phase, by replacing the film of air surrounding the surface of the solid by molecules of liquid. They then substantially improve the output of the dissolvent/grinder during the phase of disagglomeration of the associates. Finally, these dispersion agents, adsorbed on the surface of the solid, constitute a layer of solvated polymer, at the origin of steric forces of repulsion, and, in the case of polyelectrolytes in aqueous medium, of electrostatic forces of repulsion, which oppose the attractive Van de Waals forces, thus ensuring the stability of the dispersion.

In order to be efficient, a copolymer which may be used as a dispersant must therefore comprise a sequence of anchoring, presenting a good affinity for the surface of the particles, as well as one or more sequence(s) compatible with the continuous phase in which these solids are incorporated.

In the absence of one of these constituents, or in the case of desorption of the dispersant, the system flocculates, a phenomenon which shows itself by the reagglomeration of the particles, and an increase in viscosity of the dispersion. In the particular case of a paint, a poor dispersion of the pigments within the binding agent is translated by considerable colorimetric divergences and loss of brillance on the final film.

In order to overcome these problems, dispersion agents have been proposed, which make it possible to formulate paints specifically in aqueous medium (EP 018 099) or in organic medium (U.S. Pat. No. 4 032 698; GB 1 393 401 and 1 393 402). However, these products offer only a partial solution, insofar as the mixture of different pigments, inorganic and organic, or interactions between the dispersant and the continuous phase, as may be the case in lacquers, bring about a loss of stability of the suspension.

The synthesis of new additives, containing several sequences, based on the use of polyisocyanates, as described in Patents U.S. Pat. No. 4,647,647 or EP 0 520 586, makes it possible to overcome these difficulties. Nonetheless, the use of polyisocyanates, molecules presenting a high toxicity and poorly defined functionality, leads to obtaining a product constituted by a mixture of various structures, of which the properties of adsorption and of dispersion are not optimal. In addition, this process prevents the presence in the copolymer of polar functions containing a reactive hydrogen atom, chemical functions appreciated when using in an aqueous medium or for promoting the compatibility with the resins.

Furthermore, monografted copolymers, obtained by the "macromonomer" technique and/or grafting of telomers of polyether type on a preformed chain constituted by one or more unsaturated ethylene monomers and comprising nitrogenous moieties, form the subject matter of Patent EP 0 311 157.

The copolymers of the present invention contain a sequence allowing them to be anchored on the solid particles, particularly pigments and fillers, as well as at least 2 sequences of respectively hydrophilic and hydrophobic character, allowing use thereof in the compositions in aqueous and/or organic medium. The presence of a sequence insoluble in selective medium surprisingly increases the quantity of dispersant adsorbed on the surface of the particles, thus avoiding the phenomenon of flocculation during the mixture of different pigments.

On the other hand, the plurality of chemical functions within the same copolymer, as well as the possibility of formulating pigmentary concentrates without elongation resin, improve compatibility with the resins, thus allowing the formulation of paints from a wide range of binding agents.

Moreover, the process of synthesis makes it possible to obtain products of homogeneous structure, whose performances are not limited by the presence of contaminants.

The invention therefore has for its object a grafted copolymer comprising at least three sequences of distinct chemical nature, among which one or more sequence(s) for anchoring on the solid particles, one or more sequence(s) of hydrophobic character and one or more sequence(s) of hydrophilic character, constituted by:

1) 1 to 80% by mass, preferably 5 to 40% by mass, of one or more sequence(s) for anchoring on the solid particles, constituted by a straight or branched hydrocarbon chain, cycloalkyl or aromatic, comprising basic nitrogenous groups of type: heterocyclic, $-NH_2$, $-NH$, $-NHR$, $-NR_2$, $-CONH_2$, $-CONHR$, $-CONR_2$ (where R is an alkyl radical ($C_1-C_6$) optionally substituted by one or more groups $-OH$, $-COO-$, $-CO-$, $-O-$, $-SO_3H$), which may comprise $-COO-$ groups, and whose molar mass is included between 150 and 10000, preferably between 300 and 3000, the mass content of basic nitrogenous monomers in the anchoring chain being 5% minimum and preferably 30%, and 2) 10 to 90% by mass, preferably 25 to 80% by mass, of one or more sequence(s) of hydrophobic character, constituted by a straight or branched hydrocarbon chain, cycloalkyl or aromatic, which may comprise groups $-COO-$, $-S-$, $-F$, $-Si(OR')_n(R'')_{2-n}-$ (where R' and R" represent similar or different alkyl or aryl radicals ($C_1-C_{10}$) and n=0 to 2), formed by monomer units whose parameter of solubility is less than or equal to 21.5 $J^{1/2}/cm^{3/2}$, preferably less than 19 $J^{1/2}/cm^{3/2}$, and whose molar mass is included between 250 and 10000, preferably between 500 and 3500, and 3) 10 to 90% by mass, preferably 15 to 70% by mass, of one or more sequence(s) of hydrophilic character, constituted by a straight or branched hydrocarbon chain comprising groups —O—, —OH, —NCO—, —COO—, —COOH, —CONH$_2$, —CONHR''' (where R''' is an alkyl radical (C$_1$–C$_3$)), —NH—, —S—, —SO$_3$H, formed by monomer units whose parameter of solubility is greater than 22 J$^{1/2}$/cm$^{3/2}$, preferably greater than 22.5 J$^{1/2}$cm$^{3/2}$, and whose molar mass is included between 250 and 10000, preferably between 300 and 3000.

It will be noted that there advantageously exist three different ways of combining the three types of sequences: anchoring, hydrophobic and hydrophilic. The grafted copolymers according to the invention may therefore present the following structures alternately:

principal anchoring chain+at least 2 respectively hydrophilic and hydrophobic grafts principal hydrophobic chain+at least 2 respectively hydrophilic and anchoring grafts principal hydrophilic chain+at least 2 respectively hydrophobic and anchoring grafts.

The grafted copolymers comprising a principal anchoring chain and at least 2 respectively hydrophilic and hydrophobic grafts are preferred compounds according to the invention.

According to a preferred aspect, the invention concerns a grafted copolymer as defined hereinabove comprising at least three sequences of distinct chemical nature, in which the principal chain is a sequence of anchoring on the solid particles constituted by a straight or branched hydrocarbon chain, cycloalkyl or aromatic, comprising basic nitrogenous groups of type: heterocyclic, —NH$_2$, —NH—, —NHR, —NR$_2$, —CONH$_2$, —CONHR, —CONR$_2$ (where R is an alkyl radical (C$_1$–C$_6$) optionally substituted by one or more groups —OH, —COO—, —CO—, —O—, —SO$_3$H) which may comprise groups —COO—, and whose molar mass is included between 150 and 10000, preferably between 300 and 3000, the mass content in basic nitrogenous monomers in the anchoring chain being 5% minimum and preferably 30%.

The invention advantageously also concerns a grafted copolymer as defined hereinabove, in which the principal chain is a sequence of hydrophobic character constituted by a straight or branched hydrocarbon chain, cycloalkyl or aromatic, which may comprise groups —COO—, —S—, —F, —Si(OR')$_n$(R'')$_{2-n}$— (where R' and R'' represent similar or different, alkyl or aryl radicals (C$_1$–C$_{10}$) and n=0 to 2), formed by monomer units of which the parameter of solubility is less than or equal to 21.5 J$^{1/2}$/cm$^{3/2}$, preferably less than 19 J$^{1/2}$/cm$^{3/2}$, and whose molar mass is included between 250 and 10000, preferably between 500 and 3500.

Other preferred grafted copolymers are products as defined hereinabove, in which the principal chain is a sequence of hydrophilic character, constituted by a straight or branched hydrocarbon chain, comprising groups —O—, —OH, —NCO—, —COO—, —COOH, —CONH$_2$, —CONHR''' (where R''' is an alkyl radical (C$_1$–C$_3$)), —SO$_3$H, formed by monomer units of which the parameter of solubility is greater than 22 J$^{1/2}$cm$^{3/2}$, and of which the molar mass is included between 250 and 10000, preferably between 300 and 3000.

The parameters of solubility expressed in J$^{1/2}$/cm$^{3/2}$ were calculated by the Hoftyzer-Van Krevelen method of incrementation or measured experimentally (case of polydimethyl-siloxane). The molar volumes necessary for calculating the parameters of solubility are calculated from the Feedor data. These means of calculation and experimental values are set forth in the work by D. W. VAN KREVELEN "Properties of polymers. Their correlation with chemical structure; their numerical estimation and prediction from additive group contributions", Third edition, Elsevier 1990, pages 189–225.

The invention also concerns said copolymer in the form of one of its salts, obtained by quaternization or neutralization of the basic functions.

The invention also relates to the processes for preparing the grafted copolymers defined hereinabove.

The synthesis of the grafted copolymers according to the invention is based on the use of the "macromonomer" technique and/or the grafting of functionalized telomers on a preformed grafted or straight chain.

Thus, these dispersants may be prepared by radical-like copolymerization of one or more hydrophilic macromonomer(s) and of one or more hydrophobic macromonomer(s) with one or more nitrogenous comonomer(s) and optionally with one or more unsaturated ethylene comonomer(s) and/or reactive unsaturated ethylene comonomer(s).

These syntheses are effected under inert atmosphere in the presence of a solvent or an appropriate mixture of solvents, i.e. in which the reagents, macromonomers, comonomers are totally soluble and the final products are totally or at least partially soluble. These solvents will in particular be selected from the aromatic hydrocarbons such as toluene or xylene; ethers such as dioxane or tetrahydrofuran, ketones such as acetone or methylethylketone, esters such as ethyl acetate or butyl acetate. Dioxane or tetrahydrofuran will preferably be used in the preparation of the grafted copolymers.

Synthesis begins by the preparation of the macromonomers, by telomerization then fixation of a double bond at the end of chain, followed by the copolymerization of said macromonomers with the comonomers.

The grafted copolymers according to the invention may also be prepared by fixing one or more functionalized molecules, one of the two types of hydrophilic or hydrophobic grafts, or even the two types of grafts, on a polymer preformed with the aid of reactive monomers, this chain already being able to contain one or more hydrophilic or hydrophobic graft(s) incorporated by radical-like method. In that case, the course of the reaction imposes the use of at least two distinct reactors, the first serving for preparing the principal chain, the second intended for preparing the telomer.

Grafting of these side chains on the preformed polymer may then be carried out by adding the contents of the reactor or reactors containing the telomers to the first. It may be advantageous to effect this addition in several steps in order to adjust the properties of the final copolymer as best possible.

The invention also relates to compositions containing one or more grafted copolymer(s) as defined hereinabove, at least one pigment and/or one filler and/or a fibrous solid, and, optionally, an organic solvent and/or water.

The invention also has for an object a pigment or a filler or a coated fibrous solid from compositions containing one or more grafted copolymer(s) as defined hereinabove.

Finally, the invention concerns the use of said copolymer(s) as dispersing agents, stabilizers of solid particles or emulsifiers in an aqueous and/or organic medium, their use for preparing pigmentary dispersions in aqueous and/or organic medium and the paints and inks containing them.

Description of the Sequence of Anchoring on the Solid Particles

The grafted copolymers according to the invention present, distributed along their sequence of anchoring, basic nitrogenous groups disposed in statistic manner and chosen for their affinity with the surface of numerous pigments and fillers, both organic and inorganic.

Said basic groups may be defined by their pKa, included between 2 and 14, preferably between 5 and 14, in particular between 5 and 12. The measurements of pKa are made at 25° C. in water at a molar concentration of 0.01.

According to one of its aspects, the invention therefore concerns a grafted copolyer as defined hereinabove in which the anchoring sequence(s) comprises or comprise basic nitrogenous groups introduced from one or more compounds selected for example from:

a) the vinylpyridines, such as 2-vinylpyridine, 3-vinylpyridine, 4-vinylpyridine or 2-methyl-5-vinylpyridine, vinylimidazole, 2-methyl-N-vinylimidazole, vinylcarbazole, N-vinylpyrrolidone, 3-methyl-N-vinlpyrazole, 4-methyl-5-vinylthiazole, N-vinylcaprolactam, ethylimidazolidone methacrylate, the (meth)acrylamides such as (meth)acrylamide, N-methylacrylamide, N-isopropylacrylamide and N,N-dimethylacrylamide, N-methylol(meth)acrylamide, N,N-dimethylol(meth)acryl-amide, 2-acrylamido-2-methyl-1-propanesulfonic acid, diacetone acrylamide, methyl-2-acrylamido-2-methoxyacetate, N-tris-(hydroxymethyl)methylacrylamide, the aminoalkyl(meth)acrylates of following formula:

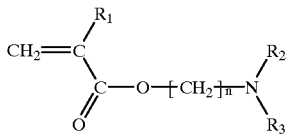

where $R_1$ is an atom of hydrogen or an alkyl radical ($C_1$–$C_4$); $R_2$ and $R_3$, identical or different, each represent an alkyl radical ($C_1$–$C_6$), n=0 to 6, said nitrogenous groups being in this first case introduced by radical-like copolymerization of one or more unsaturated ethylene monomer(s) mentioned hereinabove, and b) N-N-diethyl-1,4-butanediamine, 1-(2-aminoethyl)-piperazine, 2-(1-pyrrolidyl)-ethylamine, 4-amino-2-methoxy-pyrimidine, 2-dimethylamino-ethanol, 1-(2-hydroxyethyl)-piperazine, 4-(2-hydroxyethyl)-morpholine, 2-mercapto-pyrimidine, 2-mercaptobenzimidazole, N,N-dimethyl-1,3-propanediamine, 4-(2-aminoethyl)-pyridine, N-N-diallyl-melamine, 3-amino-1,2,4-triazole, 1-(3-aminopropyl)-imidazole, 4-(2-hydroxyethyl)-pyridine, 1-(2-hydroxyethyl-imidazole, 3-mercapto-1,2,4-triazole, said nitrogenous groups being in this second case fixed on a straight or grafted copolymer, putting to good use the reactive functions introduced along the preformed chain.

Among compounds a), use will preferably be made of the monomers of vinylpyridine, vinylimidazole, (meth)acrylamide, N,N-dimethylacrylamide and 2-dimethylaminoethyl methacrylate type.

Compounds b) mentioned hereinabove are preferably grafted directly on the copolymer from reactive chemical functions incorporated by radical-like copolymerization of one or more reactive unsaturated ethylene monomer(s) containing one or more groups comprising at least one atom of hydrogen reactive with respect to functions such as for example the epoxy group, selected from —OH, —SH, —COOH, —NH$_2$, —NHR (where R is an alkyl radical possessing from 1 to 3 carbon atoms).

The following may be used for example:

hydroxylated compounds: 2-hydroxyethyl (meth)acrylate, 2- or 3-hydroxypropyl (meth)acrylate, 4-hydroxybutyl (meth)-acrylate, carboxylated compounds: (meth)acrylic acid, maleic acid, fumaric acid, itaconic acid, crotonic acid, maleic anhydride, monomers bearing an epoxy function: glycidyl methacrylate.

Monomers bearing hydroxy and epoxy functions will preferably be used, and more particularly hydroxyethyl (meth)-acrylates, hydroxypropyl (meth)acrylates and glycidyl meth-acrylate.

The proportion of the reactive monomers contained in the copolymer lies between 0 and 80% by mass, preferably between 0 and 40% by mass.

It is often advantageous likewise to copolymerize one or more neutral unsaturated ethylene monomer(s) with the nitrogenous monomer(s) a) mentioned hereinabove and/or the reactive monomer(s) allowing grafting of the compounds b) mentioned above.

In fact, these monomers, although they do not influence the dispersing and stabilizing capacities of the copolymer directly, make it possible favourably to modify certain of its properties, such as for example its vitreous transition temperature, its stability or its mechanical properties.

These monomers will for example be acrylic or methacrylic acid esters, vinyl, styrene or alkylstyrene esters.

The content of neutral unsaturated ethylene monomers in the final copolymer may vary from 0 to 76% by mass, and in particular from 0 to 28% by mass.

The unsaturated ethylene monomers introducing the compounds a), the reactive unsaturated ethylene monomers used for grafting the compounds b) and the neutral unsaturated ethylene monomers described hereinabove as well as the hydrophilic and hydrophobic macromonomers are copolymerized by radical-like method from conventionally used primers, for example organic peroxides, redox systems, or preferably azo compounds.

Description of the Sequence of Hydrophobic Character

The sequence(s) of hydrophobic character are chosen so that their properties of solubility are complementary of those of the sequence(s) of hydrophilic character mentioned hereinafter, in order to give the bigrafted copolymer its character of universal dispersant with respect to solvents and binding agents.

The organosoluble polymers formed by monomer units whose parameter of solubility is less than or equal to 21.5 $J^{1/2}/cm^{3/2}$, preferably less than 19 $J^{1/2}/cm^{3/2}$, constitute these sequences of hydrophobic character and make it possible to disperse the particles in a polar medium. The incorporation of this (these) sequence(s) or graft(s) in the copolymer may be effected by copolymerizing by the radical-like method one or more organosoluble macromonomer(s) with one or more unsaturated ethylene comonomer(s) mentioned above in the description of the anchoring sequence, namely one or more nitrogenous ethylene monomer(s), optionally one or more neutral unsaturated ethylene monomer(s) and at least one macromonomer of hydrophilic character described hereinbelow (from the primers usually used, for example organic peroxides, redox systems or preferably azo compounds), and will lead to the formation of a bigrafted copolymer.

These grafts of hydrophobic character may also be fixed by grafting on a straight or branched copolymer constituted by one or more unsaturated ethylene monomer(s) mentioned above in the description of the anchoring sequence, namely one or more monomer(s) a) and/or one or more reactive unsaturated ethylene monomers(s) used to graft the compounds b) on the copolymer and/or one or more neutral unsaturated ethylene monomer(s) and/or one or more macromonomer(s) of hydrophilic character described hereinbelow and/or of hydrophobic character, from one or more telomer(s) of hydrophobic character.

The telomers of hydrophobic character may be grafted directly on the copolymer with the aid of the reactive groups in accordance with the process described hereinabove for the anchoring sequence.

According to the invention, the monomer units constituting the macromonomers and telomers used for preparing the sequence(s) of hydrophobic character will for example be introduced from the following compounds:

(meth)acrylic acid esters such as methyl (meth)acrylate, ethyl (meth)acrylate, propyl (meth)acrylate, butyl (meth)-acrylate, hexyl (meth)acrylate, cyclohexyl (meth)acrylate, ethylhexyl (meth)acrylate, octyl (meth) acrylate, nonyl (meth)-acrylate, isodecyl (meth) acrylate, lauryl (meth)acrylate, stearyl (meth)acrylate, pentadecyl (meth)acrylate, cetyl (meth)acrylate, behenyl (meth)acrylate, 3-(trimethoxysilyl)-propyl (meth) acrylate, vinyl esters such as vinyl acetate, vinyl propionate, vinyl butyrate, vinyl sorbate, vinyl hexanoate, vinyl ethylhexanoate, vinyl laurate, vinyl stearate, styrene and alkystyrenes such as α-methylstyrene, vinyltoluene, tertiobutylstyrene, dienes such as butadiene, isoprene, which may be hydrogenated after polymerization, alkylenes such as ethylene, propylene, siloxans such as dimethylsiloxan, diphenylsiloxan, methyl-phenylsiloxan, fluorinated compounds such as trifluoroethyl (meth) acrylate, pentafluoropropyl (meth)acrylate, heptafluorobutyl (meth)acrylate, octafluoropentyl (meth) acrylate, pentadecafluorooctyl (meth)acrylate, eicosafluoroundecyl (meth)acrylate, vinyl fluoride, tetrafluoroethylene.

The products of polycondensation, polyesters or polyamides, such as those prepared from either diacids and diols with long alkyl chains, or from hydroxyacids with long alkyl chains (for the polyesters), or from either diacids and diamines with long alkyl chains, or aminoacids with long alkyl chains (for the polyamides) may also constitute the telomers and macromonomers used.

Preferably, the grafted copolymers according to the invention will be prepared by radical-like copolymerization from one or more macromonomer(s), of which the constituent units are preferably chosen from the (meth)acrylic acid esters or vinyl esters comprising at least 8 carbon atoms, as well as the styrenics and alkylstyrenics such as styrene and tertio-butylstyrene and the fluorinated monomers, in particular tri-fluoroethyl methacrylate, and synthesized by telomerization from a chain transfer agent, then condensation on a (meth)-acrylic, vinylic or allylic, preferably (meth)acrylic monomer.

The molar mass of the hydrophobic grafts obtained by this technique is included between 250 and 10000 and will advantageously be included between 500 and 3500.

On the other hand, the content of hydrophobic grafts in the final bigrafted copolymer by mass is included between 10 and 90% and preferably between 25 and 80%.

Description of the Sequence of Hydrophilic Character

The sequence(s) of hydrophilic character, distributed statistically along the principal chain of the copolymer, are at the origin of the solubility of the copolymers in water. It is these sequences which stabilize the dispersions of particles in aqueous medium.

The parameter of solubility of the monomer units constituting these grafts is greater than or equal to 22 $J^{1/2}/cm^{3/2}$, preferably greater than 22.5 $J^{1/2}/cm^{3/2}$.

The introduction of these side chains in the copolymer may be effected by using one or more macromonomer(s) of hydrophilic character. A macromonomer of this type is composed of a hydro-soluble polymer terminated at one of its ends by a group which is polymerizable in radical manner. This group may for example be of the (meth)acrylic, vinylic or allylic, preferably (meth)-acrylic type.

The copolymerization of one or more of these macromonomer(s) with one or more unsaturated ethylene comonomer(s) mentioned above in the description of the anchoring sequence, namely one or more compounds a), one or more neutral unsaturated ethylene monomer(s), and at least one macromonomer of hydrophobic character described hereinabove (from the primers usually used, for example organic peroxides, redox systems, or preferably azo compounds), will lead to the formation of a bigrafted copolymer according to the invention.

These grafts of hydrophilic character may also be fixed by grafting on a straight or branched copolymer constituted by one or more unsaturated ethylene monomer(s) mentioned above in the description of the anchoring sequence, namely one or more nitrogenous unsaturated ethylene monomer(s) a) and/or one or more reactive unsaturated ethylene monomer(s) used for grafting the compounds b) on the copolymer and/or one or more neutral unsaturated ethylene monomer(s) and/or one or more macromonomer(s) of hydrophobic character described hereinabove and/or hydrophilic, from one or more telomer(s) of hydrophilic character.

These telomers are constituted by a hydrosoluble polymer functionalized at the end of chain by a group containing a reactive hydrogen atom, —OH, —NH$_2$, —NHR (where R is an alkyl radical comprising from 1 to 3 carbon atoms), —COOH, —SH.

The telomers may be grafted directly on the copolymer from reactive groups.

According to the invention, the monomer units constituting the macromonomers and telomers, used for preparing the sequence(s) of hydrophilic character will be selected for example from:

ethylene oxide, (meth)acrylic acids, maleic acid, fumaric acid, itaconic acid, derivatives of acrylamide such as (meth)acrylamide, N-methylacrylamide, N-isopropylacrylamide, ethyleneimine, vinyl alcohol, vinylpyrrolidone, vinylmethyloxazolidone, vinylsulfonate, sodium methallylsulfonate, glycerol methacrylate.

The grafted copolymers according to the invention are preferably prepared by radical method ("macromonomer" technique, from macromonomers such as: poly(ethylene glycol) (meth)acrylates, the products HEMA-5 and HEMA-10 marketed by Bimax Chemicals Ltd. The molar mass of the grafts of hydrophilic character is chosen between 250 and 10000 and preferably between 300 and 3000.

On the other hand, the mass content represented by these hydrosoluble grafts in the final copolymer is from 10 to 90% and in particular from 15 to 70%.

In a subsequent aspect, the invention also concerns a process for preparing the grafted copolymers according to the invention.

As mentioned above, said copolymers may be prepared by radical copolymerization from macromonomers and/or by grafting polymers functionalized on a preformed chain, and consequently present a well controlled structure.

This mode of synthesis offers the further possibility of adjusting the molar mass of the anchoring sequence in order to increase the rate of adsorption of the copolymers on the particles, both inorganic and organic, as well as that of the side chains, improving their compatibility with the continuous phase.

Thus, by using the grafted copolymers according to the invention for preparing pigmentary concentrates, a state of dispersion superior to that obtained from the dispersants of the prior art is attained. Moreover, the high molar mass of the products according to the invention makes it possible to prepare pigmentary concentrates without elongation resin.

Radical-like copolymerization is preferably effected at a temperature included between 50° C. and 140° C., and the grafting reaction at a temperature preferably included between 20° C. and 150° C.

The order of addition of the monomers during radical copolymerization is advantageously as follows:
- the macromonomers, of high molar mass and consequently less reactive, are incorporated with the solvent in the reactor from the beginning;
- the comonomer(s) constituting the principal chain, which are more reactive, are continuously introduced in the course of time, so that their concentration is always low with respect to that of the macromonomers.

Preparation of a Grafted Copolymer in Which the Principal Chain is a Sequence of Anchoring on the Solid Particles According to a first variant, the invention therefore concerns a process for preparing a grafted copolymer as defined hereinabove comprising at least three sequences of distinct chemical nature, among which a sequence of anchoring on the solid particles, one or more sequence(s) of hydrophobic character and one or more sequence(s) of hydrophilic character, in which the principal chain is a sequence of anchoring on the solid particles, characterized in that the following is effected:

1) the radical copolymerization of:
   i) 0 to 80% by mass, preferably 0 to 40% by mass, of one or more monomer(s) comprising at least one basic nitrogenous group of the heterocyclic type, —NH$_2$, —NHR, NR$_2$, —CONHR, —CONHR, —CONR$_2$ (where R is an alkyl radical (C$_1$–C$_6$), optionally substituted by one or more group(s) —COO—, —CO—, —O——OH—, —SO$_3$H) and
   ii) 0 to 90% by mass, preferably 0 to 80% by mass, of one or more macromonomer(s) represented by the formula:

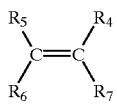

where R$_4$, R$_5$, R$_6$, identical or different, represent an atom of hydrogen or an alkyl radical (C$_1$–C$_4$),
R$_7$ is a sequence of hydrophobic character, constituted by a straight or branched hydrocarbon chain, cycloalkyl or aromatic, which may comprise groups —COO—, —S—, —F—, —Si(OR')$_n$(R'')$_{2-n}$— (where R' and R'' represent similar or different alkyl or aryl radicals (C$_1$–C$_{10}$), and n=0 to 2) formed by monomer units of which the parameter of solubility is less than or equal to 21.5 J$^{1/2}$/cm$^{3/2}$, preferably less than 19 J$^{1/2}$/cm$^{3/2}$, and whose molar mass is included between 250 and 10000, preferably between 500 and 3500, and iii) 0 to 90% by mass, preferably 0 to 70% by mass, of one or more macromonomer(s) represented by the formula:

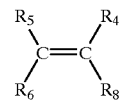

where R$_4$, R$_5$, R$_6$ are as defined hereinabove, and
R$_8$ is a sequence of hydrophilic character, constituted by a straight or branched hydrocarbon chain comprising groups —O—, —OH—, NCO—, —COO—, —COOH, —CONH$_2$, —CONHR''' (where R''' is an alkyl radical (C$_{1-C3}$), —NH—, —S—, —SO$_3$H, formed by monomer units of which the parameter of solubility is greater than 22 J$^{1/2}$/cm$^{3/2}$, preferably greater than 22.5 J$^{1/2}$/cm$^{3/2}$, and of which the molar mass is included between 250 and 10000, preferably between 300 and 3000, and iv) 0 to 80% by mass, preferably 0 to 40%, of one or more monomer(s) containing at least one group capable of being engaged in a coupling reaction, and v) 0 to 76% by mass, preferably 0 to 28%, of one or more unsaturated ethylene monomer(s) which may contain up to 25 carbon atoms, apart from the monomers already mentioned in i), it being understood that, if one of the mass contents of the compounds defined in i), ii) and/or iii) is zero, the mass content of the compounds defined in iv) is different from 0, and 2) grafting on this preformed chain of:
vi) 0 to 80% by mass, preferably 0 to 40%, of one or more molecule(s) deriving from a compound comprising at least one heterocyclic basic nitrogenous group, —NH$_2$, —NHR or —NR$_2$ (where R is an alkyl radical (C$_1$–C$_6$) and containing at least one group capable of being engaged in a coupling reaction, and vii) 0 to 90% by mass, preferably 0 to 80% by mass, of one or more telomer(s) represented by the formula:

where G represents a group containing a reactive hydrogen atom, —OH, —COOH, —SH—, —NH$_2$, —NHR''' (where R''' is an alkyl radical (C$_1$–C$_3$)), and R$_7$ is as defined hereinabove, and viii) 0 to 90% by mass, preferably 0 to 70%, of one or more telomer(s) represented by the formula $$G\text{—}R_8$$

where G and $R_8$ are as defined hereinabove, it being understood that:

the contents by mass of the compounds defined in i) and in vi) cannot be equal to 0 simultaneously, and when one of them is equal to 0, then the other is equal to at least 1%, the contents by mass of the compounds defined in ii) and in vii) cannot be equal to 0 simultaneously, and when one of them is equal to 0, then the other is equal to at least 10%, the contents by mass of the compounds defined in iii) and in viii) cannot be equal to 0 simultaneously, and when one of them is equal to 0, then the other is equal to at least 10%.

According to this first variant of the process, a grafted copolymer as defined above is prepared, constituted by a principal chain for anchoring on the solid particles and at least 2 grafts, respectively hydrophobic and hydrophilic, said copolymers being preferred products according to the invention.

Preparation of a Grafted Copolymer in Which the Principal Chain is a Sequence of Hydrophobic Character According to a second variant, the invention also concerns a process for preparing a grafted copolymer comprising at least three sequences of distinct chemical nature, among which one or more anchoring sequence(s), a sequence of hydrophobic character and one or more sequence(s) of hydrophilic character, in which the principal chain is a sequence of hydrophobic character, as defined hereinabove, characterized in that the radical copolymerization is effected of:

i) 10 to 90% by mass, preferably 25 to 80% by mass, of one or more monomer(s) of hydrophobic character comprising at least one aromatic group, —COO—, —F, or —Si(OR') n (R")$_2$— (where R' and R" represent identical or different alkyl or aryl radicals ($C_1$–$C_{10}$), and n=0 to 2) constituting after polymerization a chain formed by monomer units of which the parameter of solubility is less than or equal to 21.5 $J^{1/2}/cm^{3/2}$, preferably less than 19 $J^{1/2}/cm^{3/2}$, and of which the molar mass is included between 250 and 10000, preferably between 500 and 3500, and ii) 0 to 90% by mass, preferably 0 to 70% by mass, of one or more macromonomer(s) represented by the formula:

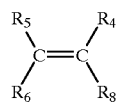

where $R_4$, $R_5$, $R_6$ are as defined hereinabove, and $R_8$ is a sequence of hydrophilic character, constituted by a straight or branched hydrocarbon chain, comprising groups —O—, —OH, —NCO—, —COO—, —COOH, —CONH$_2$, —CONHR''' (where R''' is an alkyl radical ($C_1$–$C_3$)), —NH—, —S—, —SO$_3$H, formed by monomer units of which the parameter of solubility is greater than 22 $J^{1/2}/cm^{3/2}$, preferably greater than 22.5 $J^{1/2}/cm^{3/2}$ and of which the molar mass is included between 250 and 10000, preferably between 300 and 3000, and iii) 0 to 80% by mass, preferably 0 to 40% by mass, of one or more macromonomer(s) represented by the formula

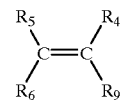

where $R_4$, $R_5$, $R_6$ are as defined hereinabove, and $R_9$ is an anchoring sequence, constituted by a straight or branched hydrocarbon chain, cycloalkyl or aromatic, comprising basic nitrogenous groups of type: heterocyclic, —NH$_2$, —NH—, —NHR, —NR$_2$, CONH$_2$, CONHR, —CONR$_2$ (where R is an alkyl radical ($C_1$–$C_6$), optionally substituted by one or more groups —OH, —COO—, —CO—, —O—, —SO$_3$H) which may comprise groups —COO— and of which the molar mass is included between 150 and 10000, preferably between 300 and 3000, the content of basic nitrogenous monomers in the anchoring chain by mass being 5% minimum and preferably 30%, and iv) 0 to 80% by mass, preferably 0 to 40%, of one or more monomer(s) containing at least one group capable of being engaged in a coupling reaction, it being understood that if one of the contents by mass of the compounds defined in i), ii) and/or iii) is zero, the content by mass of the compounds defined in iv) is different from 0, and 2) grafting on this preformed chain of:

v) 0 to 90% by mass, preferably 0 to 70% of one or more telomer(s) represented by the formula $$G\text{—}R_8$$

where G represents a group containing an atom of reactive hydrogen, —OH, —COOH, —SH, —NH$_2$, —NHR''' (where R''' is an alkyl radical ($C_1$–$C_3$)), and $R_8$ is as defined hereinabove, and vi) 0 to 80% by mass, preferably 0 to 40%, of one or more telomer(s) represented by the formula $$G\text{—}R_9$$

where G and $R_9$ are as defined hereinabove, it being understood that:

the contents by mass of the compounds defined in ii) and in v) cannot be equal to 0 simultaneously, and when one of them is equal to 0, then the other is equal to at least 10%, the contents by mass of the compounds defined in iii) and vi) cannot be equal to 0 simultaneously and when one of them is equal to 0, then the other is equal to at least 1%.

According to this second variant of the process, a grafted copolymer as defined above is prepared, constituted by a principal hydrophobic chain and at least 2 respective hydrophilic and anchoring grafts.

Preparation of a Grafted Copolymer in Which the Principal Chain is a Sequence of Hydrophilic Character According to a subsequent aspect, the invention relates to a third variant of the process for preparing a grafted copolymer comprising at least three sequences of distinct chemical nature, among which one or more anchoring sequence(s), one or more sequence(s) of hydrophobic character and a sequence of hydrophilic character as defined hereinabove, in which the principal chain is a sequence of hydrophilic character, characterized in that the radical copolymerization is effected of i) 10 to 90% by mass, preferably 15 to 70% by mass, of one or more monomer(s) of hydrophilic character comprising at least one group selected from —O—, —OH—, —COOH—, —COO—, —SO$_3$H, —CONH$_2$, —CONHR''' (where R''' is an alkyl radical (C$_1$–C$_3$)) and constituting after polymerization a chain formed by monomer units of which the parameter of solubility is greater than 22 J$^{1/2}$/cm$^{3/2}$, preferably greater than 22.5 J$^{1/2}$/cm$^{3/2}$, and whose molar mass is included between 250 and 10000, preferably between 300 and 3000, and ii) 0 to 90% by mass, preferably 0 to 80% by mass, of one or more macromonomer(s) represented by the formula:

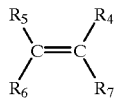

where R$_4$, R$_5$, R$_6$, identical or different, represent an atom of hydrogen or an alkyl radical (C$_1$–C$_4$), R$_7$ is a sequence of hydrophobic character, constituted by a straight or branched hydrocarbon chain, cycloalkyl or aromatic, able to comprise groups —COO—, —S—, —F, —Si(OR')$_n$(R'')$_{2-n}$— (where R' and R'' represent identical or different alkyl or aryl radicals (C$_1$–C$_{10}$), and n=0 to 2), formed by monomer units of which the parameter of solubility is less than or equal to 21.5 J$^{1/2}$/cm$^{3/2}$, preferably less than 19 J$^{1/2}$/cm$^{3/2}$ and whose molar mass is included between 250 and 10000, preferably between 500 and 3500 and iii) 0 to 80% by mass, preferably 0 to 40% by mass, of one or more macromonomer(s) represented by the formula:

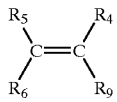

where R$_4$, R$_5$, R$_6$ are as defined hereinabove, and R$_9$ is an anchoring sequence constituted by a straight or branched hydrocarbon chain, cycloalkyl or aromatic, comprising basic nitrogenous groups of type: heterocyclic, —NH$_2$, —NH—, —NHR, —NR$_2$, —CONH$_2$, —CONHR, —CONR$_2$ (where R is an alkyl radical (C$_1$–C$_6$), optionally substituted by one or more groups —OH, —COO—, —CO—, —O—, —SO$_3$H) which may comprise —COO— groups and of which the molar mass is included between 150 and 10000, preferably between 300 and 3000, the content of basic nitrogenous monomers in the anchoring chain by mass being 5% minimum and preferably 30%, and iv) 0 to 80% by mass, preferably 0 to 40%, of one or more monomer(s) containing at least one group capable of being engaged in a coupling reaction, it being understood that, if one of the contents by mass of the compounds defined in i), ii) and/or iii) is zero, the content by mass of the compounds defined in iv) is different from 0, and 2) grafting on this preformed chain of v) 0 to 90% by mass, preferably 0 to 80% by mass, of one or more telomer(s) represented by the formula:

where G represents a group containing an atom of reactive hydrogen, —OH, —COOH, —SH, —NH$_2$, —NHR'' (where R''' is an alkyl radical (C$_1$–C$_3$)) and R$_7$ is as defined hereinabove, and vi) 0 to 80% by mass, preferably 0 to 40%, of one or more telomer(s) represented by the formula

where G and R$_9$ are as defined hereinabove, it being understood that:

the contents by mass of the compounds defined in ii) and in v) cannot be equal to 0 simultaneously and when one of them is equal to 0, then the other is equal to at least 10%, the contents by mass of the compounds defined in iii) and in vi) cannot be equal to 0 simultaneously and when one of them is equal to 0, then the other is equal to at least 1%.

According to this third variant of the process, a grafted copolymer as defined hereinabove is prepared, constituted by a principal hydrophilic chain and at least 2 respective hydrophobic and anchoring grafts.

Preferred grafted copolymers according to the invention are those comprising a principal chain for anchoring on the solid particles comprising dialkylaminoethyl (meth)acrylate, 2-vinylpyridine, 4-vinylpyridine, N,N-dimethylacrylamide groups, alone or mixed, one or more hydrophilic grafts poly(ethylene oxide), and one or more hydrophobic grafts based on alkyl (meth) acrylate, vinyl esters alone or copolymerized with styrene and alkylstyrene derivatives, fluorinated monomers (trifluoroethyl methacrylate), or 3-(trimethoxysilyl)propyl methacrylate.

Use of the Grafted Copolymers According to the Invention

The grafted copolymers according to the invention are advantageously usable for the preparation of pigmentary concentrates. In fact, the presence within the copolymer of sequences of hydrophilic and hydrophobic character allows the dispersion of a number of solid particles in a liquid and the formulation of pigmentary pastes of equal performances in an aqueous and/or organic medium.

Said copolymers also advantageously allow the preparation of pigmentary concentrates without added resin, which improves the compatibility of these pastes with a large range of binding agents.

By way of example, pigmentary concentrates containing the copolymers according to the invention may be prepared by using the following pigments, fillers and fibrous solids:

inorganic pigments such as titanium dioxides, zinc oxides, zinc sulfates, zinc phosphates, lithopones, carbon blacks, iron oxides, manganese phosphates, cobalt aluminates, antimony sulfates or zinc chromates, metallic pigments, organic pigments such as oxazines, dioxazines, thiazines, phthalocyanines, xanthenes, acrydines, quinacridones or perylenes.

The grafted copolyers according to the invention will advantageously be used for incorporating fillers or fibrous solids in paints, particularly for the dispersion of aluminum oxides and hydroxides, quartz, silicas, talcs, kaolins, micas, calcium sulfates, barium sulfates or calcium carbonates. The paint films made by using said copolymers advantageously present a reduced sensitivity to water, while conserving a high brilliancy at application.

In order to prepare pigmentary concentrates, the grafted copolymers according to the invention will preferably be used at a rate of a solid particle/dispersant mass ratio included between 1/50 and 100/1, in particular 1/10 and 20/1.

The reactional mixture obtained at the end of the synthesis of the grafted copolyer may be used either directly or after concentration by distillation under reduced pressure or azeotropic distillation possibly by adding a cosolvent.

The reaction medium may also be replaced by adding a solvent having a higher boiling temperature or forming an azeotrope therewith, then eliminating the reaction solvent by distillation under reduced pressure or azeotropic distillation. The reaction solvent may thus advantageously be replaced by water or a liquid miscible with water to formulate aqueous pastes.

Alternately, it is possible to isolate the grafted copolymer according to the invention in a selective solvent or by complete elimination of the reaction solvent. Said copolymer will then be redissolved in an adequate liquid or used as such if its viscosity allows this.

The pigments, fillers and fibrous solids may also be treated by a solution of grafted copolymer according to the invention, for example in fluidized bed or in a cyclone, the coated particles thus obtained then being redispersed in a liquid or a mixture of appropriate liquids.

The dispersions of solid particles, pigments, fillers or fibrous solids in a liquid are effected in accordance with the grinding and impasting processes usual in the domain of paints and inks.

EXAMPLES

Unless indicated to the contrary, the parts cited in the examples refer to quantities by mass.

1. Telomers and Macromonomers Used in the Syntheses

The telomers (homopolymers or copolymers bearing at one of their ends a reactive chemical function capable of being engaged in a coupling reaction) as well as the macromonomers (homopolymers or copolymers bearing at one of their ends a double bond capable of being engaged in a reaction of polymerization by radical-like method), used for the preparation of the grafted copolymers, were synthesized from the technique well known to one skilled in the art and described in publications C. BONARDI et coll. Makromolekulare Chemie, 186, 261 (1985) or K. ITO et coll, Macrocmolecules, 13, 216 (1980), or more generally in 2 reference works: A. AKELAH et al, "Functionalized polymers and their applications", Chapman & Hall, New York (1990), and Y. YAMASHITA, "Chemistry and Industry of Macromonomers", Hüthig & Wepf, New York (1993).

The characteristics of the telomers used in the course of the syntheses are grouped together in Table 1 hereinbelow.

The characteristics of the macromonomers obtained by chemical modification of the preceding telomers are presented in Table 2 hereinbelow.

2. Examples of Grafted Copolymers Synthesized by Radical-like Method

Example 1

In a reactor surmounted by a refrigerator, 2 adding funnels, an admission of nitrogen, a stirrer and a thermometer, 100 parts of the solution of macromonomer A, 10.9 parts of poly(ethyleneglycol) methacrylate of mean molar mass 500 (HEMA-10) and 170 parts of tetrahydrofuran (THF) are introduced. The temperature of the solution is fixed at 65° C. under an inert atmosphere of nitrogen. The adding funnel 1 is filled with 1.2 parts of 2-dimethylaminoethyl methacrylate (MADAME) and 40 parts of THF, while funnel 2 contains 0.1 part of azobisisobutyronitrile (AIBN) and 40 parts of THF. The contents of the 2 funnels are introduced dropwise in the reactor in 2 hours. The reaction is continued for 6 hours at the polymerization temperature, Tp, of 65° C.

A yellow solution of grafted copolymer is then obtained, of mean molar mass in number (Mn) 6400 and index of polydispersity (Ip) 1.94, in the THF, measured by gel permeation chromatography (GPC) with the aid of an apparatus of the WATERS 150 ALC/GPC type from PS standards. The molar masses were determined to within±units.

Examples 2 to 14

Examples of grafted copolymers synthesized by radical-like method in accordance with the modus operandi described in Example 1 are shown in Table 3. Only the parts relative to the siliconed macromonomer marketed as AK-5 (TOAGOSEI Chemicals Ltd) concern the dry macromonomer, the toluene and methyl-ethylketone (MEK) having been previously eliminated by distillation.

Comparative Example 15

In a reactor similar to the one described in Example 1, there are introduced 80 parts of poly(ethyleneglycol) methacrylate of mean molecular mass 300 (HEMA-5) and 1330 parts of THF. After having brought the temperature of the solution to Tp=65° C., there are added, simultaneously and in 2 hours, the contents of the funnels 1 and 2, filled respectively with 20 parts of MADAME, 100 parts of lauryl methacrylate (LMA), 225 parts of THF and 1.7 parts of AIBN, 225 parts of THF. The mixture is left to evolve for 6 hours at 65° C.

A yellow solution of monografted copolymer is then obtained, containing only one hydrophilic macromonomer (the hydrophobic monomer, LMA, being present in the form of monomer units, statistically distributed along the principal anchoring chain), with Mn=16400 and Ip=2.28, in THF.

3. Examples of Grafted Copolymers Synthesized by Radical Method then Grafting

Example 16

In a reactor similar to the one described in Example 1, there are introduced 11.5 parts of poly(ethyleneglycol)

methacrylate of mean molar mass 500 (HEMA-10) and 170 parts of tetrahydrofuran (THF). The solution is taken to Tp=65° C. There are then introduced into the reactor, via the funnel 1, 11.5 parts of N-N-dimethylacrylamide (DMAm), 5.8 parts of glycidyl methacrylate (GLMA) and 40 parts of THF, in two hours. Simultaneously and during the same period, there are added, via funnel 2, 1 part of azobisisobutyronitrile (AIBN) and 40 parts of THF.

After 5 hours of reaction, a pale yellow solution of copolymer is recovered, with Mn=21300 and Ip=1.74.

In a second step, 100 parts of solution of telomer E, 4.8 parts of triethylamine (Et$_3$N) and 210 parts of toluene are introduced in the reactor. The temperature of the solution is then fixed at 90%, after elimination of the residual THF by distillation. This grafting temperature, Tgr, will be maintained for 6 hours.

Finally, a yellow solution of grafted copolymer is obtained, with Mn=4500 and Ip=2.37, in tululene.

Example 17

In a reactor similar to the one described in Example 1, there are introduced 39.5 parts of poly(ethyleneglycol) methacrylate of mean molecular mass 300 (HEMA-5) and 780 parts of THF, then the temperature of the solution is taken to 65° C. Under a nitrogen flow, the two adding funnels allow the addition, on the one hand, of 13.2 parts of 2-hydroxyethyl methacrylate, 78.9 parts of 2-dimethylaminoethyl methacrylate (MADAME), 195 parts of THF and, on the other hand, of 1.4 parts of AIBN, 195 parts of THF, simultaneously and continuously in 2 hours. Polymerization will be continued for a further 5 hours at Tp=65° C.

An intermediate monografted copolymer solution, with Mn=4300 and Ip=2.03 is recovered.

The grafting step then begins with the cooling of the reactional mixture to ambient temperature. 100 parts of the solution of telomer D, 18.0 parts of dicyclohexylcarbodiimide (CDDI) and 3.9 parts of 4-dimethylaminopyridine (DMAP) are then added in the reactor. The grafting temperature Tgr is maintained at 25° C. for 6 hours.

After filtration of the acylurea formed during condensation, a yellow solution of grafted copolymer is obtained, with Mn=2300 and Ip=1.99.

Examples 18 to 21

Complementary examples, made in accordance with the modi operandi described in Examples 16 and 17, are described in Table 4. The parts mentioned in this Table relative to the telomers refer to solutions of telomers.

4. Examples of Pigmentary Concentrates Prepared from the Grafted Copolymers of the Invention

Example 22

The solution of copolymer obtained in Example 6 is concentrated to 50%. 250 parts of water are then added to the residue, then the residual solvent is eliminated by distillation to recover the grafted copolymer in solution in water at 22.2% by mass.

This aqueous solution of copolymer is used during the preparation of two pigmentary pastes, respectively containing an inorganic oxide yellow pigment (yellow pigment C.I.42) and an organic phthalocyanine blue pigment (blue pigment C.I.15), and of which the compositions are given in Table 5.

These pigmentary concentrates, prepared in accordance with conventional impasting techniques, known to one skilled in the art, are then subjected for 1 hour to grinding by zirconium balls.

The characteristics of these pigmentary concentrates, assessed after grinding, are presented in Table 6.

Example 23

In the same manner as in Example 22, 500 parts of the solution of copolymer described in Example 7 are concentrated and then transferred in aqueous medium by addition of 280 parts of water and distillation, in order, finally, to obtain a solution of dispersant at 16.1% by mass.

The composition as well as the properties of the pigmentary concentrates formulated from this dispersant are given respectively in Tables 5 and 6.

Examples 24 and 25

500 parts of the copolymer solutions described respectively in Example 10 (Example 24) and in Example 11 (Example 25) are treated in accordance with the modus operandi described in Example 22, using in both cases 250 parts of water.

In this way, two aqueous solutions of dispersant of dry extract 18.8% by mass are obtained, which are used for formulating pigmentary concentrates of which the compositions and properties are given respectively in Tables 5 and 6.

Comparative Example 26

500 parts of the copolymer solution described in comparative Example 15 are treated in accordance with the modus operandi described in Example 22, using 150 parts of water.

After evaporation of the residual solvent, an aqueous solution of dispersant of dry extract 35.5% by mass is obtained, which will be used for formulation of pigmentary concentrates of which the compositions and properties are given in Tables 5 and 6.

5. Examples of Paints Prepared from Grafted Copolymers

In order to test the compatibility of the pigmentary concentrates, formulated from the grafted copolymers, with certain binding agents, said concentrates were used alone or in mixture to tint 3 types of paints of which the formulae are given hereinafter:

| Paint I: (vinyl acetate/ethylene/ vinyl chloride terpolymer resin) | |
|---|---|
| water | 178 |
| binding agent | 178 |
| filler | 460 |
| titanium dioxide pigment | 160 |
| filler dispersant | 9 |
| sodium hydroxide solution | 8 |
| rheological agent | 4 |
| anti-foam agent | 2 |
| biocide | 1 |

| Paint II: (styrene-acrylic resin in emulsion) | |
|---|---|
| water | 200 |
| glycol | 40 |
| binding agent | 402 |
| filler | 141 |
| titanium dioxide pigment | 191 |
| filler dispersant | 14 |
| ammonia solution | 2 |
| rheological agent | 2 |
| anti-foam agent | 3 |
| biocide | 1 |

| Paint III: (alkyde resin long in oil) | |
|---|---|
| white-spirit | 137 |
| binding agent | 507 |
| titanium dioxide pigment | 330 |
| dispersant | 5 |
| drying agent | 13 |
| conservation agent | 8 |

The pigmentary concentrates are mixed with paints, respecting the proportions mentioned in Table 7 hereinbelow.

Example 27

Paints I, II and III are tinted by the two pigmentary concentrates based on yellow oxide (pigment yellow C.I.42) and phthalocyanine blue (pigment blue C.I.15) described in Example 22 in order to test the compatibility of the grafted copolymer of Example 6, used as dispersant, with different binding agents.

The tests used are the following:

Test of compatibility: two samples of the same paint, taken respectively after 3 and 10 minutes of stirring by means of an apparatus of the Red-Devil type, are applied side by side on a contrast card.

"Touch or finger" test (or "Rub-test"): On the film of wet paint, 3 minutes after application, a slight pressure of the index is applied so as to crush the film locally. In order to express the results of these tests, a graduated scale from 0 to 10 is adopted, such that:

0=no flocculation, good compatiblity, no difference between the sample at 3 mins and at 10 mins, and the rub-test shows no difference between the crushed zone and the rest of the film. 10=system flocculated, problem of compatibility, the samples at 3 and 10 mins, as well as the zone crushed in the rub-test and the rest of the film, presenting a considerable divergence of shade.

The results of the compatibility tests with each of paints I, II, III are presented in Table 8.

Examples 28–30

Three series of 9 samples, Examples 28, 29, 30, are prepared from paints I, II and III as well as the two pigmentary concentrates formulated respectively in Examples 23, 24 and 25 respectively containing the grafted copolymers of Examples 7, 10 and 11 as dispersant, in accordance with the method described in Example 27.

The results of the tests carried out on these paints are shown in Table 8.

Comparative Example 31

Three series of samples were prepared from paints I and III and the two pigmentary concentrates elaborated in comparative Example 26 containing the grafted copolymer of comparative Example 15 as dispersant, in accordance with the modus operandi presented in Example 27.

The results of the tests carried out on these paints are shown in Table 8.

The results of Table 8 show that, with the paints of Examples 27, 28, 29 and 30 containing the pigmentary concentrates of Examples 22, 23, 24 and 25 respectively comprising the grafted copolymers according to the invention of Examples 6, 7, 10 and 11, the compatibility of the dispersant assessed by the tests mentioned in Example 27 is very good in all cases. On the other hand, with the paints of comparative Example 31 containing the pigmentary concentrates elaborated in comparative Example 26 comprising the copolymer of Example 15, a poor compatibility of the dispersant is obtained.

TABLE 1

Characteristics of the solutions of telomers used in the synthesis of the grafted copolymers

| Telomer | A | B | C | D | E | F |
|---|---|---|---|---|---|---|
| Nature of telomer | PLMA | PLMA | PLMA | PLMA | PLMA | P(LMA-s-EHMA) 17.9 & 18.0 |
| Parameter of solubility S ($inJ^{1/2}/cm^{3/2}$) | 17.9 | 17.9 | 17.9 | 17.9 | 17.9 | |
| Functional group | —OH | —COOH | —COOH | —COOH | —OH | —OH |
| Molar mass (Mn) | 3100 | 1000 | 2400 | 1200 | 2500 | 1900 |
| Polydispersity index (Ip) | 2.04 | 2.23 | 1.35 | 2.61 | 1.36 | 1.24 |
| Solvent of telomer | THF | Toluene | THF | Toluene | Toluene | Toluene |
| Dry extract (in % by mass) | 11.4 | 16.7 | 43.7 | 19.2 | 41.7 | 45.3 |

TABLE 2

Characteristics of the solutions of macromonomers used in the synthesis of the grafted copolymers

| Macromonomer | A | B | C | E | F | HEMA-5 | HEMA-10 | AK-5 |
|---|---|---|---|---|---|---|---|---|
| Nature of macromonomer | PLMA | PLMA | PLMA | PLMA | P(LMA-s-EHMA) | POE | POE | PDMS |
| Corresponding telomer | A | B | C | E | F | | | |
| Parameter of solubility S (in $J^{1/2}/cm^{3/2}$) | 17.9 | 17.9 | 17.9 | 17.9 | 17.9 & 18.0 | 22.9 | 22.9 | 10.2–15.8 |
| Molar mass | 3100 | 1000 | 2500 | 2700 | 1900 | 310 | 530 | 5000 |
| Polydispersity index (Ip) | 1.99 | 2.05 | 1.40 | 1.45 | 1.24 | | | |
| Solvent of macromonomer | THF | Toluene | THF | Toluene | Toluene | | | Toluene/MEK |
| Dry extract (in % by mass) | 10.9 | 14.6 | 36.4 | 36.6 | 22.0 | 100% | 100% | 40% |

TABLE 3

Examples of grafted copolymers synthesized by radical method from macromonomers

| | Example | 2 | 3 | 4 | 5 | 6 |
|---|---|---|---|---|---|---|
| Anchoring sequence | 2-dimethylaminoethyl methacrylate | | 5.5 | | | 16.7 |
| | Acrylamide | 9.5 | 11.5 | 13.1 | | |
| | 2-Vinylpyridine | 5.5 | | 4.6 | | |
| | 1-Vinylimidazole | | | | 13.2 | |
| Hydrophobic sequence | Solution of macromonomer B | 100 | 100 | | | |
| | Solution of macromonomer C | | | 100 | 100 | |
| | Solution of macromonomer E | | | | | 100 |
| Hydrophilic sequence | Macromonomer HEMA-5 | | | | 30.5 | |
| | Macromonomer HEMA-10 | 22.5 | 20.5 | 22.0 | | 25.0 |
| Primer | Azobisisobutyronitrile | 0.3 | 0.5 | 0.5 | 0.3 | 0.6 |
| Polymerization solvent | Tetrahydrofuran | 310 | 20 | 220 | 240 | 550 |
| Conditions of polymerisation | Temperature of polymerisation Tp (° C.) | 65 | 65 | 65 | 65 | 65 |
| | Duration of polymerisation | 8 | 8 | 8 | 8 | 8 |
| Caracteristics of copolymer | Molar mass (Mn) | 5200 | 8600 | 7200 | 6800 | 4200 |
| | Polydispersity index (Ip) | 1.81 | 1.93 | 1.84 | 1.89 | 1.53 |

| | Example | 7 | 8 | 9 | 10 | 11 | 12 | 13 | 14 |
|---|---|---|---|---|---|---|---|---|---|
| Anchoring sequence | 2-dimethylaminoethyl methacrylate | 26.0 | 8.3 | | 8.3 | 18.5 | 25.0 | | 23.1 |
| | Acrylamide | | 8.3 | | | | | 33.3 | |
| | 2-Vinylpyridine | | | | 8.3 | 4.6 | | 22.2 | |
| | 1-Vinylimidazole | | | 16.7 | | | | | |
| Hydrophobic sequence | Solution of macromonomer E | 100 | 100 | 100 | 100 | 100 | | | |
| | Solution of macromonomer F | | | | | | | | 100 |
| | Macromonomer AK-5 | | | | | | 100 | 100 | |
| Hydrophilic sequence | Macromonomer HEMA-5 | | | | | | 125.0 | 66.7 | |
| | Macromonomer HEMA-10 | 36.5 | 25.0 | 25.0 | 25.0 | 27.8 | | | 46.1 |
| Primer | Azobisisobutyronitrile | 0.9 | 0.8 | 0.9 | 0.7 | 0.8 | 2.0 | 1.8 | 1.1 |
| Polymerization solvent | Toluene | | | | | | 2170 | 1930 | |
| | Tetrahydrofuran | 690 | 550 | 550 | 550 | 615 | | | 850 |
| Conditions of polymerisation | Temperature of polymerisation Tp (° C.) | 65 | 65 | 65 | 65 | 65 | 70 | 70 | 65 |
| | Duration of polymerisation ( | 8 | 8 | 8 | 8 | 8 | 10 | 8 | 8 |
| Caracteristics of copolymer | Molar mass (Mn) | 4500 | 5200 | 2400 | 4100 | 4500 | 6000 | 5700 | 4200 |
| | Index of polydispersity (Ip) | 1.59 | 1.67 | 1.40 | 1.56 | 1.58 | 1.79 | 1.70 | 1.53 |

TABLE 4

Examples of grafted copolymers synthesized by radical method then grafting of telomers

| Steps | | Example | 18 | 19 | 20 | 21 |
|---|---|---|---|---|---|---|
| Synthesis of intermediate monografted copolymer | Adsorption monomers | N,N-Dimethylacrylamide | | | | 14.4 |
| | | 2-dimethylaminoethyle methyacrylate | | | 14.4 | |
| | | 2-Vinylpyridine | 10.0 | 20.0 | | |
| | Coupling monomer | Glycidyl methacrylate | | | 7.2 | 7.2 |
| | | 2-hydroxyethyl methacrylate | 15.0 | 30.0 | | |
| | Comonomer | Methacrylate | 30.0 | 60.0 | | |
| | Hydrophilic sequence | Macromonomer HEMA-10 | 45.0 | 90.0 | 14.4 | 14.4 |
| | Primer | Azobisisobutyronitrile | 0.9 | 1.7 | 0.3 | 0.4 |
| | Solvent | Tetrahydrofuran | 890 | 1770 | 320 | 320 |

TABLE 4-continued

Examples of grafted copolymers synthesized by radical method then grafting of telomers

| Steps | | Example | 18 | 19 | 20 | 21 |
|---|---|---|---|---|---|---|
| | Conditions of polymerisation | Temperature of polymerisation Tp (in ° C.) | 65 | 65 | 65 | 65 |
| | | Duration of polymerisation (in hrs.) | 8 | 8 | 8 | 8 |
| | Caracteristics of the mono-grafted | Intermediate molar mass (Mn) | 2300 | 2300 | 11500 | 21300 |
| | | Intermediate polydispersity index (IP) | 1.27 | 1.27 | 1.77 | 1.74 |
| Grafting of telomer | Hydrophohic sequence | Solution of telomer C | 100 | 100 | | |
| | | Solution of telomer E | | | 100 | 100 |
| | Catalysts of the coupling reaction | Triethylamine | | | 12.0 | 6.0 |
| | | Dicyclohexylcarbodiimide | 30.0 | 30.0 | | |
| | | 4-Dimethylaminopyridine | 1.5 | 2.0 | | |
| | Solvent added | Toluene | | | | 260 |
| | Conditions of grafting | Temperature of grafting Tar (in ° C.) | 30 | 30 | 65 | 80 |
| | | Duration of grafting reaction (in hrs) | 8 | 8 | 10 | 20 |
| | Caracteristics of copolymer | Molar mass (Mn) | 5200 | 6300 | 4700 | 4100 |
| | | Final polydispersity index (Ip) | 1.95 | 2.12 | 2.15 | 2.48 |

TABLE 5

Composition of the pigmentary concentrates formulated from the grafted copolymers

| | 22 | | 23 | | 24 | | 25 | | 26 comparative example | |
|---|---|---|---|---|---|---|---|---|---|---|
| Example | Yellow oxide Yellow Pigment C.I.42 | phthalo cyanine blue Blue pigment C.I.15 | Yellow oxide Pigment yellow C.I.42 | phthalo cyanine blue Blue pigment C.I.15 | Yellow oxide Yellow Pigment C.I.42 | phthalo cyanine blue Blue pigment C.I.15 | Yellow oxide Yellow Pigment C.I.42 | phthalo cyanine blue Blue Pigment C.I.15 | Yellow oxide Yellow Pigment C.I.42 | phthalo cyanine blue Blue Pigment C.I.15 |
| Dry extract of solution of dispersant (in % by mass) | 22.2 | 22.2 | 16.1 | 16.1 | 18.8 | 18.8 | 18.8 | 18.8 | 35.5 | 35.5 |
| Water | 77.3 | 18.6 | 40.2 | 5.4 | 61.1 | 8.8 | 72.0 | 9.9 | 106.1 | 101.3 |
| Pigment | 181.7 | 62.1 | 131.4 | 45.1 | 154.0 | 52.6 | 154.0 | 52.6 | 249.2 | 60.5 |
| Solution of dispersant | 100 | 100 | 100 | 100 | 100 | 100 | 100 | 100 | 100 | 100 |
| Anti-foam | 1.2 | 1.3 | 0.9 | 0.9 | 1.0 | 1.1 | 1.0 | 1.1 | 1.6 | 1.3 |
| Rheological agent | | | | | | | | | 20.3 | |

TABLE 6

Properties of the pigmentary concentrates formulated from grafted copolymers

| | 22 | | 23 | | 24 | | 25 | | 26 comparative example | |
|---|---|---|---|---|---|---|---|---|---|---|
| Example | Yellow oxide Yellow Pigment C.I.42 | phthalo cyanine blue Blue pigment C.I.15 | Yellow oxide Yellow Pigment C.I.42 | phthalo cyanine blue Blue pigment C.I.15 | Yellow oxide Yellow Pigment C.I.42 | phthalo cyanine blue Blue pigment C.I.15 | Yellow oxide Yellow Pigment C.I.42 | phthalo cyanine blue Blue Pigment C.I.15 | Yellow oxide Yellow Pigment C.I.42 | phthalo cyanine blue Blue Pigment C.I.15 |
| Content of pigment (% by mass) | 50.5 | 34.1 | 48.2 | 29.8 | 48.7 | 32.4 | 47.1 | 32.2 | 49.8 | 23.0 |
| Fineness after grinding | 9 à 9.5 | 8 | 9.5 à 10 | 8 à 8.5 | 9.5 à 10 | 8 à 8.5 | 9 à 9.5 | 8.5 à 9 | 8 à 8.5 | 8 |
| Viscosity Brookfield after grinding (cP) 10 rpm/min | 18000 | 9000 | 13500 | 26000 | 13500 | 10000 | 11500 | 13000 | 17500 | 42000 |

TABLE 7

Contents in pigmentary concentrate used for tinting the different paints

| Pigmentary concentrate | Paint I | Paint II | Paint III |
|---|---|---|---|
| Yellow oxide | | | |
| Yellow Pigment C.I. 42 (in % by mass) phthalo cyanine blue | 5 | 8 | 10 |
| Blue Pigment C.I. 15 (in % by mass) Yellow oxide | 2 | 3 | 6 |
| Yellow Pigment C.I. 42 + phthalo cyanine blue Blue Pigment C.I. 15 (in % by mass) | 2.5+ 1.0 | 4.0+ 1.5 | 5.0+ 3.0 |

TABLE 8

Tests of compatibility of the pigmentary concentrates prepared from grafted copolymers

| Pigmentary concentrate | Example | 27 (ex. 6) Paint I | 27 (ex. 6) Paint II | 27 (ex. 6) Paint III | 28 (ex. 7) Paint I | 28 (ex. 7) Paint II | 28 (ex. 7) Paint | 29 (ex. 10) Paint I | 29 (ex. 10) Paint II | 29 (ex. 10) III | 30 (ex. 11) Paint I | 30 (ex. 11) Paint II | 30 (ex. 11) Paint III | 31 (ex. 15) comparative ex. paint I | 31 (ex. 15) comparative ex. Paint III |
|---|---|---|---|---|---|---|---|---|---|---|---|---|---|---|---|
| Yellow oxide Yellow Pigment C.I.42 | Compatibility Rub-test | 1 | 0 | 0 | 0 | 0 | 1 | 1 | 0 | 0 | 1 | 0 | 0 | 2 | 9 |
| phthalo cyanine blue. Blue Pigment C.I.15 | Compatibility Rub-test | 1 | 0 | 0 | 0 | 0 | 0 | 0 | 0 | 0 | 1 | 0 | 0 | 4 | 10 |
| Yellow oxide + phthalocyanine blue | Compatibility Rub-test | 1 | 0 | 1 | 1 | 0 | 0 | 1 | 0 | 0 | 1 | 0 | 1 | 3 | 10 |

What is claimed is:

1. A grafted copolymer comprising:
a principal chain onto which are directly grafted at least two side chains, the grafted copolymer further comprising:
at least three sequences of distinct chemical nature, wherein a first sequence of the at least three sequence of distinct chemical nature is a sequence for anchoring onto solid particles, a second sequence of the at least three sequences of distinct chemical nature is a sequence of hydrophobic character, and a third sequence of the at least three sequences of distinct chemical nature is a sequence of hydrophilic character; wherein one of the at least three sequences of distinct chemical nature forms said principal chain and the other two of the at least three sequences of distinct chemical nature form said side chains; the grafted copolymer further comprising:
1 to 80% by mass of the sequence for anchoring onto solid particles consisting of an anchoring straight hydrocarbon chain, cycloalkyl or aromatic, comprising basic nitrogenous groups selected from the groups consisting of: heterocyclic, —NH$_2$, —NH—, —NHR, —NR$_2$, —CONH$_2$, —CONHR, and —CONR$_2$ where R is an alkyl radical (C$_1$–C$_6$) that may be substituted by one or more groups selected from the groups consisting of: —OH, —COO—, —CO—, —O—, and —SO$_3$H, wherein the anchoring chain may comprise groups —COO—, and has a molar mass included between 150 and 10000, wherein the percent by mass of basic nitrogenous monomers in the anchoring chain is 30% minimum, and
at least 10% by mass of the sequence of hydrophobic character consisting of an hydrophobic straight hydrocarbon chain, cycloalkyl or aromatic, which may comprise groups selected from the groups consisting of —COO—, —S—, —F, and —Si(OR')$_n$(R")$_{2-n}$— where R' and R" represent (C$_1$–C$_{10}$) alkyl or (C$_1$–C$_{10}$) aryl radicals, and n=0 to 2, wherein the hydrophobic chain is formed by monomer units having a parameter of solubility less than or equal to 21.5 J$^{1/2}$/cm$^{3/2}$, and wherein the hydrophobic chain has a molar mass included between 250 and 10000, and
at least 10 to 90% by mass of the sequence of hydrophilic character consisting of an hydrophilic straight hydrocarbon chain comprising groups selected from the groups consisting of —O—, —OH, —COO—, —COOH—, —S—, and —SO$_3$H, wherein the hydrophilic chain is formed by monomer units having a parameter of solubility greater than 22 J$^{1/2}$/cm$^{3/2}$, and wherein the hydrocarbon chain has a molar mass included between 250 and 10000.

2. The copolymer according to claim 1, wherein the anchoring chain is a principal chain.

3. The copolymer according to claim 1, wherein the hydrophobic chain is a principal chain.

4. The copolymer according to claim 1, wherein the hydrophilic chain is a principal chain.

5. The copolymer according to claim 1, in the form of one of its salts, obtained by quaternization or neutralization of the basic functions.

6. The copolymer according to claim 1, wherein the anchoring chain comprises basic nitrogenous groups introduced from one or more compounds selected from the groups consisting of:
a) vinylpyridines, including 2-vinylpyridine, 3-vinylpyridine, 4-vinylpyridine or 2-methyl-5-vinylpyridine, vinylimidazole, 2-methyl-N-vinylimidazole, vinylcarbazole, N-vinylpyrrolidone, 3-methyl-N-vinylpyrazole, 4-methyl-5-vinylthiazole, N-vinylcaprolactam, ethylimidazolidone methacrylate, (meth)acrylamides, including (meth)acrylamide, N-methyl-acrylamide, N-isopropylacrylamide and N,N-dimethylacrylamide, N-methylol(meth)acrylamide, N,N-dimethylol(meth)-acrylamide, 2-acrylamido-2-methyl-1-propanesulfonic acid, diacetone acrylamide, methyl-2-acrylamido-2-methoxyacetate, N-tris(hydroxymethyl) methacrylamide, and aminoalkyl(meth)acrylates of following formula:

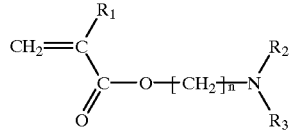

where $R_1$ is an atom of hydrogen or an alkyl radical ($C_1$–$C_4$), $R_2$ and $R_3$, identical or different, each represent an alkyl radical ($C_1$–$C_6$) and n=0 to 6, said nitrogenous groups being in this first case a) introduced by radical copolymerization of one or more unsaturated ethylene monomer(s), and b) N-N-diethyl-1,4-butanediamine, 1-(2-aminoethyl)-piperazine, 2-(1-pyrrolidyl)-ethylamine, 4-amino-(2-methoxy-pyrimidine, 2-dimethylamino-ethanol, 1-(2-hydroxyethyl)-piperazine, 4-(2-hydroxyethyl)-morpholine, 2-mercapto-pyrimidine, 2-mercaptobenzimidazole, N,N-dimethyl-1,3-propanediamine, 4-(2-aminoethyl)-pyridine, N-N-diallylmelamine, 3-amino-1,2,4-triazole, 1-(3-aminopropyl-imidazole, 3-mercapto-1,2,4-triazole, said nitrogenous groups being in this second case b) fixed by reaction on a preformed chain comprising reactive functions.

7. The copolymer according to claim 1, wherein the hydrophobic chain is constituted from monomer units selected from the groups consisting of:

the esters of (meth)acrylic acid including methyl (meth)-acrylate, ethyl (meth)acrylate, propyl (meth)-acrylate, ethylhexyl-(meth)acrylate, octyl (meth)acrylate, nonyl (meth)acrylate, isodecyl (meth)acrylate, lauryl-(meth)-acrylate, steryl-(meth) acrylate, pentadecyl-(meth) acrylate, cetyl (-meth)acrylate, behenyl (meth)acrylate, 3-(trimethoxysilyl)propyl (meth)acrylate, the vinylic esters including vinyl acetate, vinyl propionate, vinyl butyrate, vinyl sorbate, vinyl hexanoate, vinyl ethylhexanoate, vinyl laurate, vinyl stearate, styrene and alkylstyrenes including -methylstyrene, vinyl-toluene, tertiobutylstyrene, dienes including butadiene, isoprene, which may be hydrogenated after polymerization, alkylenes including ethylene, propylene, siloxanes including dimethylsiloxane, diphenylsiloxane, methylphenylsiloxane, and fluorinated compounds including trifluoroethyl (meth) acrylate, pentafluoropropyl (meth)acrylate, pentadecafluorooctyl (meth) acrylate, eicosafluoroundecyl (meth) acrylate, vinyl fluoride, tetrafluoroethylene.

8. The copolymer according to claim 1, wherein the hydrophilic chain is constituted from monomer units selected from the groups consisting of:

ethylene oxide, (meth) acrylic acids, maleic acid, fumaric acid, itaconic acid, ethyleneimine, vinylic alcohol, vinylpyrrolidone, vinylmethyloxazolidone, vinylsulfonate, sodium methallylsulfonate, and glycerol methacrylate.

9. The copolymer according to claim 1, comprising an anchoring chain comprising groups selected from the groups consisting of dialkylaminoethyl (meth) acrylate, N-N-dimethyl-acrylamide, 2-vinylpyridine, 4-vinylpyridine groups, and mixtures thereof, one or more poly(ethylene oxide) hydrophilic grafts, and one or more hydrophobic grafts based on alkyl (meth)-acrylates, vinylic esters alone or copolymerized with styrene or alkylstyrene derivatives, fluorinated monomers (trifluoroethyl)methacrylate) or 3-(trimethoxysilyl)propyl methacrylate.

10. A process for preparing a grafted copolymer according to claim 2, comprising the steps of:

forming a preformed chain by radical copolymerization of:

i) 0 to 80% by mass, of one or more monomers comprising at least one basic nitrogenous group; and ii) 0 to 90% by mass, of one or more macromonomers represented by the formula:

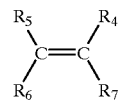

where $R_4$, $R_5$, $R_6$, identical or different, represent an atom of hydrogen or an alkyl radical ($C_1$–$C_4$), and $R_7$ is an hydrophobic straight hydrocarbon chain, and iii) 0 to 90% by mass, of one or more macromonomer (s) represented by the formula:

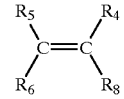

where $R_4$, $R_5$, $R_6$ represent an atom of hydrogen or an alkyl radical ($C_1$–$C_4$), and $R_8$ is an hydrophilic straight hydrocarbon chain, and iv) 0 to 80% by mass, of one or more monomers containing at least one group capable of being engaged in a coupling reaction, and v) 0 to 76% by mass, of one or more unsaturated ethylene monomer(s) able to contain up to 25 atoms of carbon, apart from the monomers already cited in i), it being understood that if the percent by mass of the compounds defined in i), ii) and/or iii) is zero, the percent by mass of the monomers defined in iv) is different from 0, and grafting on the preformed chain:

vi) 0 to 80% by mass, of one or more molecules derived from a compound comprising at least one basic nitrogenous group selected from the groups consisting of: heterocyclic, —$NH_2$, —NHR and $NR_2$ where R is an alkyl radical $C_1$–$C_6$ and containing at least one group capable of being engaged in a coupling reaction, and vii) 0 to 90% by mass, of one or more telomer(s) represented by the formula:

where G represents a group containing an atom of reactive hydrogen selected from the groups consisting of —OH, —COOH, —SH, —NH$_2$, —NHR'" where R'" is an alkyl radical (C$_1$–C$_3$), and R$_7$ is as defined in ii), and viii) 0 to 90% by mass, of one or more telomer(s) represented by the formula:

where G is as defined in vii) and R$_8$ is as defined in iii), it being understood that:
  the percent by mass of compounds defined in i) and in vi) cannot be simultaneously equal to 0, and when one is equal to 0, then the other is equal to at least 1%,
  the percent by mass of compounds defined in ii) and in vii) cannot be simultaneously equal to 0, and when one is equal to 0, then the other is equal to at least 10%,
  the percent by mass of compounds defined in iii) and in viii) cannot be simultaneously equal to 0, and when one is equal to 0, then the other is equal to at least 10%.

11. A process for preparing a grafted copolymer according to claim 3, comprising the steps of:
forming a preformed chain by radical copolymerization of:
  i) 10 to 90% by mass, of one or more monomer(s) of hydrophobic character comprising at least one aromatic group and
  ii) 0 to 90% by mass, of one or more macromonomer(s) represented by the formula

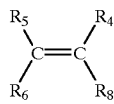

where R$_4$, R$_5$, R$_6$ represent an atom of hydrogen or an alkyl radical (C$_1$–C$_4$), and
R$_8$ is an hydrophilic straight hydrocarbon chain, and
  iii) 0 to 80% by mass, of one or more macromonomer(s) represented by the formula:

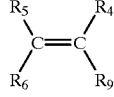

where R$_4$, R$_5$, R$_6$ represent an atom of hydrogen or an alkyl radical (C$_1$–C$_4$), and
R$_9$ is an anchoring straight hydrocarbon chain, and
  iv) 0 to 80% by mass, of one or more monomer(s) containing at least one group capable of being engaged in a coupling reaction,
  it being understood that if the percent by mass of the macromonomers defined in ii) and/or iii) is zero, the percent by mass of the monomers defined in iv) is different from 0, and grafting on the preformed chain:

v) 0 to 90% by mass, of one or more telomer(s) represented by the formula:

where G represents a group containing an atom of reactive hydrogen, selected from the groups consisting of —OH, —COOH, —SH, —NH$_2$, and —NHR'" where R'" is an alkyl radical (C$_1$–C$_3$), and R$_8$ is as defined in ii), and vi) 0 to 80% by mass, of one or more telomer(s) represented by the formula

where G is as defined in v) and R$_9$ is as defined in iii), it being understood that:
  the percent by mass of compounds defined in ii) and v) cannot simultaneously be equal to 0, and when one is equal to 0, then the other is equal to at least 10%,
  the percent by mass of compounds defined in iii) and in vi) cannot be simultaneously equal to 0, and when one is equal to 0, then the other is equal to at least 1%.

12. A process for preparing a copolymer according to claim 4, comprising the steps of:
forming a preformed chain by radical copolymerization of:
  i) 10 to 90% by mass, of one or more hydrophilic monomer(s), and
  ii) 0 to 90% by mass, of one or more macromonomer(s) represented by the formula

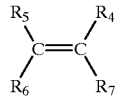

where R$_4$, R$_5$, R$_6$, identical or different, represent an atom of hydrogen or an alkyl radical (C$_1$–C$_4$),
R$_7$ is an hydrophobic straight hydrocarbon chain, and
  iii) 0 to 80% by mass, of one or more macromonomer (s) represented by the formula

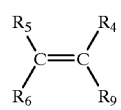

where R$_4$, R$_5$, R$_6$ represent an atom of hydrogen or an alkyl radical (C$_1$–C$_4$), and R$_9$ is an anchoring straight hydrocarbon chain, and
  iv) 0 to 80% by mass, of one or more monomer(s) containing at least one group capable of being engaged in a coupling reaction,
  it being understood that if the percent by mass of the macromonomers defined in ii) and/or iii) is zero, the percent by mass of the monomer defined in iv) is different from 0, and grafting on the preformed chain:
  v) 0 to 90% by mass, of one or more telomer(s) represented by the formula:

where G represents a group containing an atom of reactive hydrogen selected from the group consisting of —OH, —COOH, —SH, —NH$_2$, and —NHR'" where R'" is an alkyl radical ($C_1$–$C_3$), and $R_7$ is as defined in ii), and vi) 0 to 80% by mass, of one or more telomer(s) represented by the formula $$G—R_9$$

where G is as defined in v) and $R_9$ is as defined in iii), it being understood that:
the percent by mass of the compounds defined in ii) and in v) cannot be simultaneously equal to 0, and when one is equal to 0, then the other is equal to at least 10%,
the percent by mass of compounds defined in iii) and in vi) cannot be simultaneously equal to 0, and when one is equal to 0, then the other is equal to at least 1%.

13. The process according to claim 10, wherein the radical copolymerization occurs at a temperature included between 50° C. and 140° C., and the grafting occurs at a temperature included between 20° C. and 150° C.

14. The process according to claim 10, wherein the order of addition of the monomers during radical copolymerization is the following:
the macromonomers are incorporated in the reactor, with a solvent, from the beginning,
the monomers are continuously introduced in the course of time, so that their concentration is always lower than that of the macromonomers.

15. The process according to claim 10, wherein radical copolymerization or grafting of functionalized telomers or both copolymerization and grafting occur in the presence of a solvent selected from the groups consisting of aromatic hydrocarbons, ethers, ketones, esters, and mixtures thereof.

16. A composition comprising:
solid particles dispersed in an organic or aqueous solvent, and
a grafted copolymer wherein the grafted copolymer comprises one or more copolymer(s) according to claim 1, at least one solid selected from the group consisting of: a pigment, a filler, a fibrous solid, and a medium selected from the group consisting of an organic solvent, water and mixtures thereof.

17. A composition according to claim 16, wherein the solid particles are selected from the group consisting of: an inorganic pigment, a metallic pigment, an organic pigment, a mineral filler, and a fibrous solid.

18. A dispersion selected from the group consisting of: a paint, and an ink containing one or more compositions according to claim 16.

19. A process for preparing a composition according to claim 16 comprising:
mixing the solid particles with one or more copolymer(s) according to claim 16 producing a mixture; and
dispersing the mixture in a medium selected from the group consisting of an aqueous medium, an organic medium, and mixtures thereof.

20. A process of claim 19 comprising:
mixing solid particles with one or more copolymer(s) according to claim 1 producing a mixture;
maintaining a mass ratio of solid particles to copolymer included between 1:10 and 20:1; and
dispersing the mixture in a medium selected from the group consisting of aqueous, organic, and mixtures thereof.

21. An emulsification comprising as an emulsifying agent, one or more copolymer(s) according to claim 1.

22. A process for preparing pigmentary dispersions in a medium selected from the group consisting of: aqueous, organic, and mixtures thereof comprising the step of mixing at least one pigment with at least one copolymer according to claim 1.

23. The grafted copolymer of claim 1, wherein the grafted copolymer comprises 5% to 40% by mass of the anchoring chain.

24. The grafted copolymer of claim 23, wherein the molar mass of the anchoring chain ranges from 300 to 3000.

25. The grafted copolymer of claim 1, wherein the grafted copolymer comprises at least 25% by mass of the hydrophobic chain.

26. The grafted copolymer of claim 25, wherein the parameter of solubility of the monomer units of the hydrophobic chain is less than 19 $J^{1/2}/cm^{3/2}$.

27. The grafted copolymer of claim 25, wherein the molar mass of the hydrophobic chain ranges from 500 to 3500.

28. The grafted copolymer of claim 1, wherein the grafted copolymer comprises at least 15% by mass of the hydrophilic chain.

29. The grafted copolymer of claim 28, wherein the parameter of solubility of the monomer units of the hydrophilic chain is greater than 22.5 $J^{1/2}/cm^{3/2}$.

30. The grafted copolymer of claim 28, wherein the molar mass of the hydrophilic chain ranges from 300 to 3000.

31. The process according to claim 15, wherein the solvent is selected from the groups consisting of dioxane, tetrahydrofuran, toluene and mixtures thereof.

32. A pigment dispersion compatible in either an aqueous or organic medium comprising:
at least a selected one of an inorganic pigment, a metallic pigment, an organic pigment, a mineral filler, and a fibrous solid;
a selected one of an aqueous medium, an organic medium and a mixture of an aqueous and an organic medium; and
a grafted copolymer dispersant, wherein the grafted copolymer dispersant comprises a principal chain, a first side chain directly grafted to the principal chain, and a second side chain directly grafted to the principal chain, wherein the principal chain is one of three sequences selected from the group consisting of: an anchoring sequence, a hydrophobic sequence, and a hydrophilic sequence, wherein the first side chain is one of the remaining two sequences, and the second side chain is the remaining third sequence;
wherein the grafted copolymer dispersant comprises about 5% to about 80% by weight of an anchoring sequence, at least about 10% by weight of an hydrophobic sequence, and about 10% to about 90% by weight of an hydrophilic sequence;
wherein the anchoring sequence comprises a straight hydrocarbon chain, cycloalkyl or aromatic, comprising basic nitrogenous groups selected from the groups consisting of: heterocyclic, —$NH_2$, —NH—, —NHR, —$NR_2$, —$CONH_2$, —CONHR, and —$CONR_2$ where R is an alkyl radical ($C_1$–$C_6$) that may be substituted by one or more groups selected from the groups consisting of: —OH, —COO—, —CO—, —O—, and —SO3 H, wherein the anchoring chain has a molar mass between about 150 and about 10,000 and wherein the percent by mass of nitrogenous monomers is at least 30%;
wherein the hydrophobic sequence are formed of monomer units having a parameter of solubility less than or equal to 21.5 $J^{1/2}/cm^{3/2}$ and wherein the hydrophobic chain has a molar mass between about 250 and about 10,000; and wherein the hydrophilic sequence comprise groups selected form the groups consisting of —O—, —OH, —COO—, —S—, and —SO$_3$H and wherein the parameter of solubility is greater than about 22 $J^{1/2}/cm^{3/2}$ and wherein the hydrophilic chain has a molar mass between about 250 and about 10,000.

33. The pigment dispersion of claim 32, wherein the solubility of the hydrophobic sequence complements the solubility of the hydrophilic sequence.

* * * * *